US010036488B2

(12) United States Patent
Taylor

(10) Patent No.: US 10,036,488 B2
(45) Date of Patent: Jul. 31, 2018

(54) METHOD FOR MANUFACTURING A REINFORCED COMPOSITE PIPE

(71) Applicant: Composite Fluid Transfer LLC, Kilgore, TX (US)

(72) Inventor: Christopher Lynn Taylor, Tyler, TX (US)

(73) Assignee: Composite Fluid Transfer LLC, Kilgore, TX (US)

( * ) Notice: Subject to any disclaimer, the term of this patent is extended or adjusted under 35 U.S.C. 154(b) by 96 days.

(21) Appl. No.: 14/678,404

(22) Filed: Apr. 3, 2015

(65) Prior Publication Data

US 2016/0290534 A1 Oct. 6, 2016

Related U.S. Application Data

(62) Division of application No. 13/451,103, filed on Apr. 19, 2012, now abandoned.

(51) Int. Cl.
*F16L 9/128* (2006.01)
*B29C 53/58* (2006.01)
(Continued)

(52) U.S. Cl.
CPC .............. *F16L 9/133* (2013.01); *B29C 53/58* (2013.01); *B29C 65/10* (2013.01); *B29C 65/18* (2013.01);
(Continued)

(58) Field of Classification Search
CPC ... F16L 9/12; F16L 9/121; F16L 9/123; F16L 9/127; F16L 9/128; F16L 9/133;
(Continued)

(56) References Cited

U.S. PATENT DOCUMENTS 3,390,704 A * 7/1968 Woodell .................. B32B 27/00
138/143
3,481,369 A 12/1969 Ganahl
(Continued)

FOREIGN PATENT DOCUMENTS

JP 03149485 6/1991
WO 2010096935 9/2010

OTHER PUBLICATIONS

Flowtite Pipe Systems Irrigation Catalogue, date unknown, (16 pages).
(Continued)

*Primary Examiner* — Carson Gross
(74) *Attorney, Agent, or Firm* — Clark Hill Strasburger

(57) ABSTRACT

A process for manufacturing pipes using thermoplastic pipe and "tape" (continuous fiber, fully wetted in a similar thermoplastic as the pipe) that embeds the fibers into pipe surface. In one embodiment, an ambient temperature (72 degrees F.) tape is tightly wrapped around the cold pipe in a dry environment (relative humidity below 30). An external heat source is used to heat up the entire length of the pipe causing the thermoplastic to melt and the pipe to expand due to thermal expansion. Since the fibers have less stretch than the thermal expansion of the pipe the fibers will be embedded into the molten layer of the pipe, creating a permanent bond between the fibers and the pipe. A protective film is applied to the pipe. Portions of the tape and film are scraped from the surface of the pipe creating an area where the end of the pipe is coupled to another pipe using an electronic fusion coupler.

10 Claims, 5 Drawing Sheets

(51) Int. Cl.
  *F16L 9/133* (2006.01)
  *B29C 65/10* (2006.01)
  *B29C 65/18* (2006.01)
  *B29C 65/34* (2006.01)
  *B29C 65/00* (2006.01)
  *F16L 58/16* (2006.01)
  *B29L 23/00* (2006.01)

(52) U.S. Cl.
  CPC .......... *B29C 65/34* (2013.01); *B29C 66/1122* (2013.01); *B29C 66/1142* (2013.01); *B29C 66/5221* (2013.01); *B29C 66/5229* (2013.01); *B29C 66/5326* (2013.01); *B29C 66/65* (2013.01); *B29C 66/71* (2013.01); *B29C 66/72141* (2013.01); *B29C 66/7392* (2013.01); *B29C 66/861* (2013.01); *B29C 66/8612* (2013.01); *F16L 58/16* (2013.01); *B29C 53/582* (2013.01); *B29C 65/3468* (2013.01); *B29C 66/7212* (2013.01); *B29C 66/7352* (2013.01); *B29C 66/73921* (2013.01); *B29L 2023/22* (2013.01); *F16L 9/128* (2013.01)

(58) Field of Classification Search
  CPC ........ B65H 81/00; B65H 81/06; B65H 81/08; B29L 2023/22; B29C 66/721; B29C 66/7212; B29C 66/72141; B29C 66/7352; B29C 66/7392; B29C 66/73921; B29C 66/8612; B29C 53/58; B29C 53/581; B29C 53/582
  See application file for complete search history.

(56) References Cited

U.S. PATENT DOCUMENTS

| | | | | |
|---|---|---|---|---|
| 4,010,054 | A * | 3/1977 | Bradt | B29C 53/566 156/173 |
| 4,014,370 | A | 3/1977 | McNulty | |
| 4,537,225 | A | 8/1985 | McNulty | |
| 4,589,562 | A | 5/1986 | Fawley | |
| 5,638,870 | A | 6/1997 | Takada | |
| 5,683,530 | A | 11/1997 | Fawley | |
| 6,016,845 | A | 1/2000 | Quigley | |
| 6,286,558 | B1 | 9/2001 | Quigley | |
| 6,508,276 | B2 | 1/2003 | Radlinger | |
| 6,773,773 | B2 | 8/2004 | Hauber | |
| 6,889,715 | B2 | 5/2005 | Fraser | |
| 7,426,942 | B2 | 9/2008 | Rice | |
| 7,600,537 | B2 | 10/2009 | Bhatnagar | |
| 8,147,937 | B2 | 4/2012 | Brisson | |
| 8,361,580 | B2 | 1/2013 | Stark | |
| 8,440,034 | B2 * | 5/2013 | Pallini | B29C 63/10 156/160 |
| 8,944,113 | B2 | 2/2015 | Shafer | |
| 2002/0054968 | A1 | 5/2002 | Hauber | |
| 2002/0162597 | A1 | 11/2002 | Radlinger | |
| 2003/0201060 | A1 * | 10/2003 | Hauber | B29C 53/68 156/172 |
| 2003/0209312 | A1 | 11/2003 | Hauber | |
| 2004/0007279 | A1 * | 1/2004 | Yamaguchi | B29C 65/20 138/125 |
| 2010/0024843 | A1 * | 2/2010 | Gryta | B29C 53/607 134/8 |
| 2012/0291903 | A1 | 11/2012 | Ekelund | |

OTHER PUBLICATIONS

Patent Cooperation Treaty International Search Report and the Written Opinion dated Jul. 26, 2013, International Application No. PCT/US2013/037180, (8 pages).
Ticona Performance Driven Solutions, Preliminary Data, Celstran® CFR-TP HDPE GF70-01, date unknown, (1 page).
Valéron Strength Films, V-Max® Synthetic Paper, copyright 2009, (1 page).
Eurasian Office Action for Application No. 201491899/31 dated Dec. 22, 2016, (1 page).
English translation of Eurasian Office Action for Application No. 201491899/31 dated Dec. 22, 2016 (2 pages).
Australian Examination Report No. 1 for Application No. 2013249208 dated Jan. 17, 2017; (3 pages).
Mexico Office Action for Application No. MX/a/2014/012690 dated May 22, 2017, (4 pages).
Chile Examination Report for Application No. 201402824 dated Jul. 17, 2017, (6 pages).
Mexico Office Action issued for Application No. MX/a/20141012690 dated Feb. 7, 2018, (3 pages).
United Arab Emirates Examination Report issued for Application No. 1129/2014 (date unknown), (4 pages).
United Arab Emirates Search Report issued for Application No. 1129/2014 (date unknown), (3 pages).

* cited by examiner

METHOD FOR MANUFACTURING A REINFORCED COMPOSITE PIPE

BACKGROUND OF THE INVENTION

1. Field of the Invention

This invention relates to a method for manufacturing reinforced thermoplastic pipes used in transporting fluids and gasses.

2. Description of the Related Art

Transporting fluids (or even gasses), such as water and chemicals can be costly and time consuming. For example, in today's energy scarce environment, efficient oil and gas recovery techniques are vital. One means for inducing recovery is using an induced hydraulic fracturing method. "Fracturing fluids" or "pumping fluids" or "fracking fluids" consisting primarily of water and sand are injected under high pressure into the producing formation, creating fissures that allow resources to move freely from rock pores where it is trapped. Chemicals can be added to the water and sand mixture (creating a slickwater) to increase the fluid flow. Fractures provide a conductive path connecting a larger area of the formation to the well, thereby increasing the area from which natural gas and liquids can be recovered from the targeted formation.

Water for the fracturing method is supplied to the recovery site (and perhaps the fluid's byproduct from the fracturing method, known sometimes as flowback water, removed from the site) by a piping system. The piping system can consist of hundreds or thousands of yards of pipes. The piping system could include hundreds of pipes joined together by couplers to form the overall piping system. Although technically effective, environmentalists are concerned that fracking fluids may leak from the piping system thus causing damage to the environment. Consequently, many areas where oil and gas reservoirs exist may not be exploited due to environmental concerns.

Traditional pipes used for transporting fluids, such as water, are made of steel or other metals, such as aluminum. More recent pipes are composed of a plastic material such as high density polyethylene (HDPE). HDPE pipes have some advantages over metal pipes, including lower costs, abrasion resistance, corrosion resistance, high impact resistance and greater flexibility (which are especially useful over uneven terrains). These pipes are durable for gas, chemical and water applications and may be reused.

For example, a typical Yelomine™ pipe has a weight density of 300 pounds (lbs.) per 30 feet (ft.) of length. This pipe has moderate durability but needs support structure (such as support blocks) during fluid transport use.

A typical aluminum pipe used in today's fluid transport system is light weight with a weight density of 90 lbs./30 ft. of length. However it is not very durable and like the Yelomine™ pipe requires a support system during the fluid transfer. It has a pressure to weight ratio of a little more than 1.

Although HDPE pipes are in current use, such current use includes thick walled HDPE pipes, such as a DR9 HDPE pipe. To ensure the integrity of the piping system under high fluid transport pressure, the walls of the HDPE pipes are typically more than an inch thick. For example, the DR9 HDPE pipe has a wall thickness of 1.11 inches. The DR9 HDPE pipe has a weight density of a whopping 650 lbs./30 ft. It is highly durable but costs nearly 3 times more than an aluminum pipe. The pipes are difficult to transport in rough, uneven or forest terrains. Often, trucks or other mechanical movers are needed to transport the heavy pipes for construction of the system. These pipes are typically buried and then are not reusable. The pressure to weight ratio of the DR9 HDPE pipe is less than 0.4. Consequently, although thick walled HDPE pipes may be more durable then aluminum or Yelomine™ pipes, current thick walled HDPE pipes in industrial use remain very heavy. Furthermore, coupling these individual thick walled pipes to create the piping system may be slow and burdensome. That is, butt fusing systems are often used to join thick walled pipes. The use of the butt fusing system is often time consuming due to its process and the heavy equipment needed to be transported to the installation site for the connection of the pipes. In addition, as a result of environmental concerns, a couplerless piping system or a system with few couplers is desirable since most leaks occur at a coupler or joint. Consequently, the use of current thick walled HDPE pipes may not be feasible in transporting liquids or gas over a great distance or through rough terrain under high pressure.

What is needed is a lightweight and cost effective HDPE piping system that can, among other things, withstand the environment and gas and fluid pressures of current oil and gas recovery methods. The novel system needs to be designed and constructed for easy transport and installation. The lightweight pipes can be lifted and carried by 2 men. The novel system needs to provide a high flow and a high strength solution. The system needs to allow for minimal blocks or a support system in an above ground application. Rather, the novel piping system can lie on the ground during use or span voids. However, below ground installation is not restricted by the novel system. Since the novel system can be made with a thermoplastic, such as HDPE, the piping system may be resistant to theft (since metal pipes are often stolen).

In addition, the novel system may be used for other applications, such as water irrigation or temporary supply of water or removal of waste during emergencies or gas and chemical transport.

BRIEF SUMMARY OF THE INVENTION

In accordance with the present disclosure, a mechanical piping system and a method for manufacturing piping elements for use in the mechanical piping system is disclosed. As disclosed herein, the system incorporating aspects of the present invention may include a pipe, wherein the pipe is a thinned wall and made of high density polyethylene (HDPE) material. During the construction process, the thin walled HDPE pipe is cooled and then wrapped with a thermoplastic fiber tape. The tape is made with continuous and taut fibers wherein the fibers can be made from glass, carbon or synthetic fiber (such as Kevlar™ fibers). The tape is applied to the pipe at ambient room temperature (around 72 degrees F.) and relatively low humidity (for example, around 30). The tape and pipe are heated by a heat source and then allowed to cool. When heated and later cooled, the tape bonds (creating a homogenous or monolithic bond) to the pipe creating a reinforced thin wall pipe. Ends of the pipe may be further wrapped by the tape to add reinforcement to the pipe's ends. The reinforced pipe may then be wrapped with a UV protective and abrasion resistant film. Should the pipe need to endure higher pressures, a second wrapping or more wrappings at ambient temperature of the thermoplastic fiber tape is applied, heated and cooled before the UV/abrasion resistant film is applied. The system may also include a coupling connector, wherein the interior of the connector engages with the exterior of the end of the pipe. Mechanical or electrical forces are used to secure the pipe's end to the coupling connector.

The system and method disclosed herein is technically advantageous because it creates a mechanical piping system for use in high pressure application, including high pressure water transport, water irrigation or temporary water supply and removal applications. The system and method are further advantageous because the piping elements for high pressure fluid and gas transport are lighter (allowing for 2 men delivery and construction) and more durable than in existing piping systems and are also less prone to leakage. The system and method are also advantageous in that they incorporate time saving elements, making deployment and or removal of the piping system easier and faster than in current applications. Other technical advantages will be apparent to those of ordinary skill in the art in view of the following specification, claims, and drawings.

BRIEF DESCRIPTION OF THE DRAWINGS

A better understanding of the present invention can be obtained with the following detailed descriptions of the various disclosed embodiments in the drawings, which are given by way of illustration only, and thus are not limiting the present invention, and wherein.

DETAILED DESCRIPTION OF THE INVENTION

Figure 2:
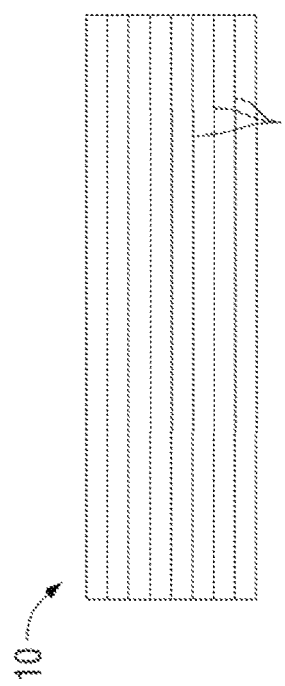
FIG. 2 is a top view of a prior art thermoplastic fibered tape.
Figure 1:
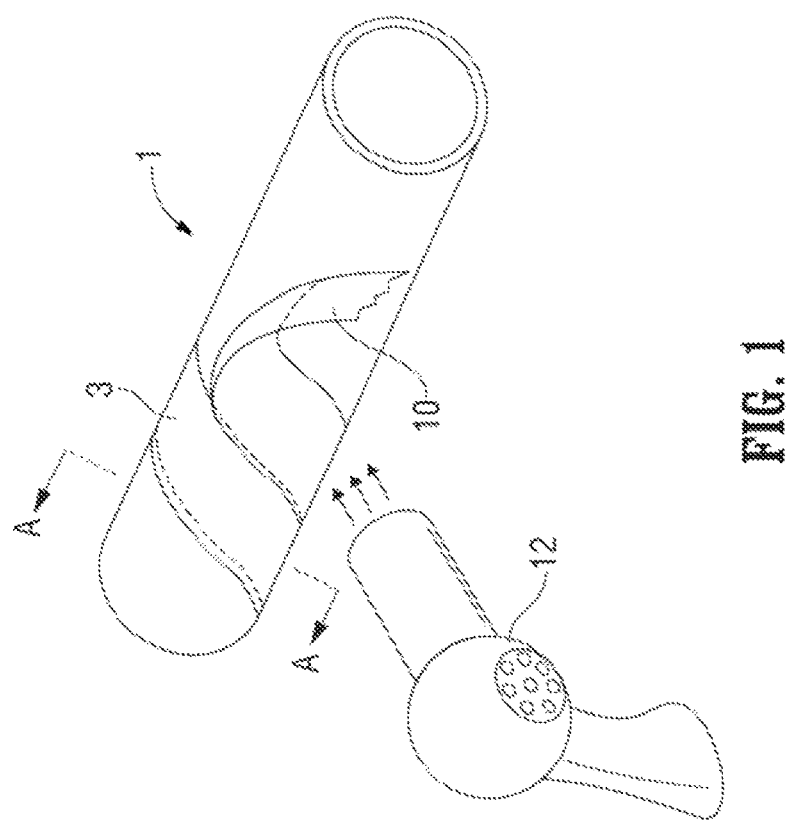
FIG. 1 is a perspective view of a tape weaved around a thermoplastic pipe according to the present invention.

In FIG. 1, a thermoplastic pipe or tube 1 is shown. In one embodiment according to the present invention, the pipe 1 is a thin walled high density polyethylene pipe. Unlike traditional prior art thick walled thermoplastic (e.g., polyethylene) pipes used for fluid/gas transport for oil and gas applications, the pipe 1 according to the present invention, has a thickness of less than 0.5 inches and preferably less than 0.25 inches. Due to the pipe's thin wall, the pipe 1 is flexible. Furthermore, the thin walled pipe 1 would not be able to withstand the pressures and other factors in oil and gas applications, where in one embodiment fluid pressures exceed 200 PSI. For reinforcement, the pipe 1 is wound with a fiber tape 10. In one embodiment, the tape 10 is made of a similar material to the pipe, such as a high density polyethylene thermoplastic tape. The tape includes continuous fibers 15 that in one embodiment, as shown in FIG. 2, are taut and run along the length of the tape. Such tapes, such as fiberglass HDPE tapes, are manufactured by Ticona Engineering Polymers under the brand name Celstran™ (Model no. CFR-TP HDPE GF70-01). In one embodiment, the tape is made of 70 percent fiberglass by weight and is a foot in width. Other widths such as 6 inches are contemplated. The fibers are continuously run (uni-directional) along the tape and are taut.

The pipe 1 is laid on a support platform and is cooled by a cooling apparatus (not shown). Such cooling means could include a localized cooler or a cooling chamber. Other cooling methods are contemplated. In one embodiment, with an ambient room temperature of approximately 72 degrees F. and a dry humidity environment (in one embodiment, a relative humidity of around 30), the pipe 1 is cooled until the outer surface temperature of the pipe is at 40 degrees F. or below. One skilled in the art would recognize that environmental conditions, such as temperature and humidity may affect the manufacturing process. The cooled pipe 1 is rotated along its central axis. As the pipe 1 is rotated, the tape 10 (generally at ambient room temperature) is applied to the pipe 1 to create a single layer of tape 10 over the pipe 1. To ensure complete coverage of the pipe 1 using a minimum amount of tape 10 (to reduce weight of the overall pipe), the tape 10 is applied securely in a barber pole fashion where some of the tape may overlap creating an overlap area 3. A heat source (such as an iron) (not shown) is used to secure the ends of the tape 10 to the outer surface of the pipe 1 to ensure that the tape 10 is tautly wound (without slack) around the pipe 1. The tape 10 and the pipe 1 are then heated by the same or another heat source 12 to a temperature to create a homogenous or monolithic bond. In one embodiment, the heat source 12 heats the tape 10 and the pipe 1 to a surface temperature of approximately 375 to 450 degrees F. The HDPE materials of both the tape and pipe melt creating a homogenous or monolithic bond. During the heating process, the pipe 1 expands due to thermal expansion. Since the tape 10 is securely wrapped over the pipe 1 and the fibers 15 are continuous and taut, the fibers 15 of the tape 10 penetrate and embed itself to the pipe 1 as the pipe expands.

Figure 3:
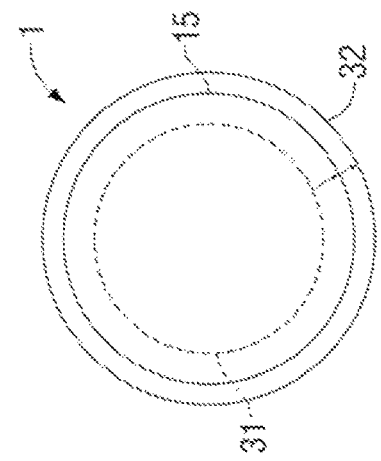
FIG. 3 is a sectional view of the thermoplastic pipe along line A-A of FIG. 1 according to the present invention.

In FIG. 3, a cross sectional view of the thermoplastic pipe along line A-A of FIG. 1 is shown. When cooled, the pipe 1 has a smaller diameter 31. Once warmed to an ambient temperature (e.g., near 72 degrees F.), the pipe's diameter 32 expands as a result of thermal expansion. The taut fibers 15 of the tape 10 become embedded into the pipe 1 as the pipe expands. Once the tape 10 and the pipe 1 cool to the ambient temperature creating a homogenous or monolithic bond, the fibers 15 are securely embedded in the pipe 1. The pipe 1 is reinforced by the fibers 15 and the lightweight thin wall pipe can now withstand the higher pressures and other factors.

Figure 4:
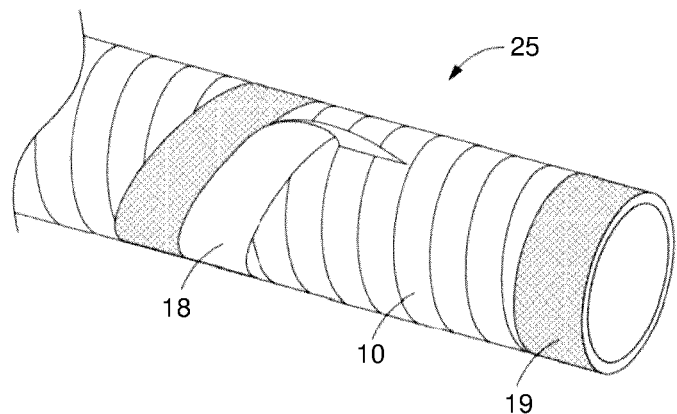
FIG. 4 is a perspective view of a thermoplastic pipe wrapped with thermoplastic fibered tape according to the present invention.

As shown in FIG. 4, for further reinforcement, a second layer of fibered tape 18 may be applied to the pipe 25 in the opposite direction as the first layer of tape 10 (creating a crisscrossing pattern). Additional layers of the fibered tape may be added to the pipe 1 for additional reinforcement. Furthermore, in one embodiment, both ends of the pipe 25 are reinforced by application of an additional fiber tape 19. The tape 19 is snugly and securely wrapped perpendicular to the center axis of the pipe 25. In one embodiment, the tape 19 is tautly wrapped several times around the pipe 25 creating reinforced areas of the ends of the pipe 25 of approximately 4 to 8 ft. in length.

Figure 5:
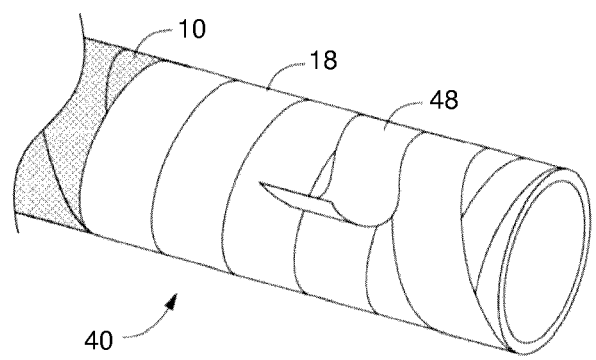
FIG. 5 is a perspective view of a UV protective/Abrasion resistant tape applied to a thermoplastic fibered tape that is wrapped around a thermoplastic pipe according to the present invention.

Next, a UV protective and abrasion resistant film may be applied to the pipe 1. One such film is manufactured by Valeron of Houston, Tex. under the brand name V-Max™. As shown in FIG. 5, typically at ambient temperature (e.g., around 72 degree F.) and a dry environment (in one embodiment, the relative humidity is around 30), a UV protective/abrasion resistant film 48 is applied over the second layer fiber tape 18 and reinforced end tape 19 (not shown) in a similar barber poll pattern. However, similar to the directions of the first layer of tape 10 (shown in FIG. 3 for illustrative purposes, but generally would be covered by the second layer 18) and the second layer fiber tape 18, the UV/abrasion resistant film 48 would be applied on the pipe 40 against the direction of the second tape 18 (creating a crisscross pattern between the second layer 18 and UV/abrasion resistant tape 48). A heat source (not shown) is used to bond the film 48 to the fiber tape 18 of the pipe 40. In one embodiment, the film 48 has a width of 12 inches.

Figure 6:
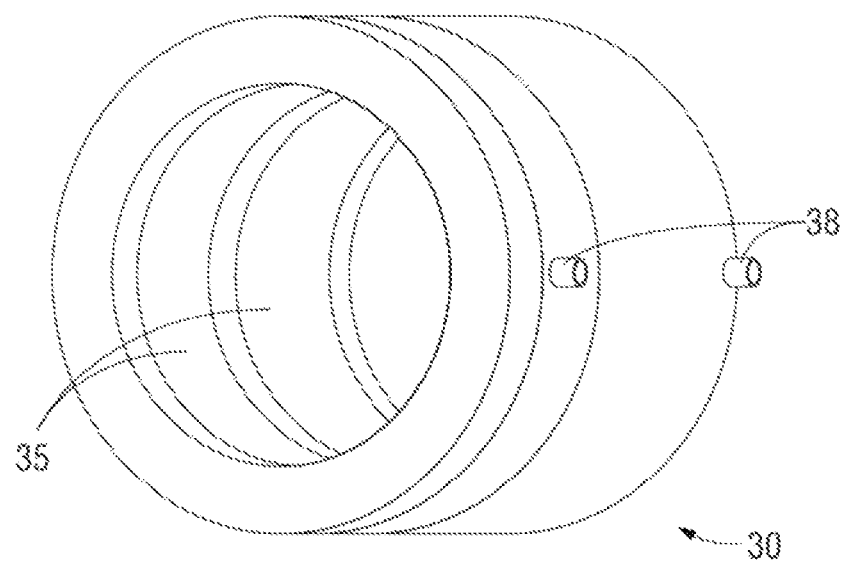
FIG. 6 is a perspective view of a prior art coupler for joining thermoplastic pipes.

The novel pipe 40 is typically 30 feet in length. Thus, in one embodiment, a coupler is used to join various sections of the pipe 40 to create the piping system. An electrostatic fusion coupler 30 is shown in FIG. 6. One exemplary coupler is manufactured by Integrity Fusion Products, Inc. of Georgia. The coupler 30 has inner diameter dimensions to allow the joining of various pipes 40. The coupler 30 has internal contact areas 35 where the outer surfaces of pipes meet up and bond with the inner surfaces of the coupler 30. Electrical ports 38 are provided to allow the entry of electrical wires to the contact areas 35.

Figure 7:
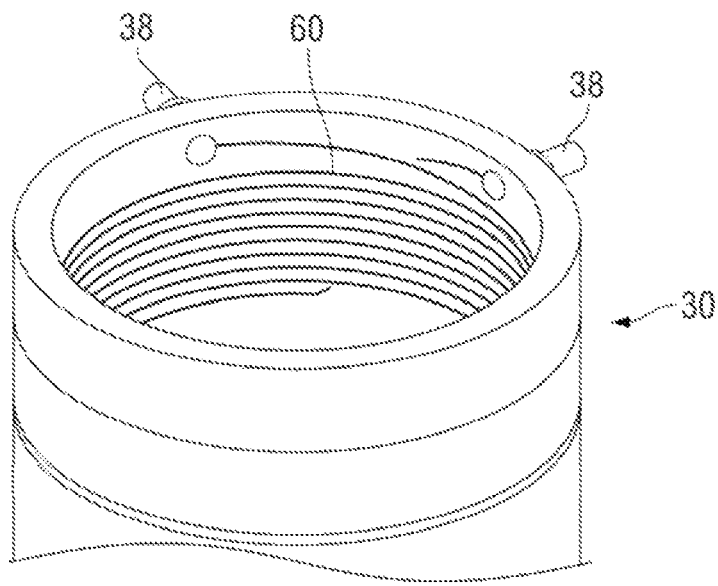
FIG. 7 is a perspective view of a prior art electronic fusion coupler.

FIG. 7 shows internal heating elements of the coupler 30. Heating elements 60 are wound within the internal surface of the coupler 30 creating the contact area 35. As an electrical current is applied to the elements 60, the resulting heat fuses the coupler 30 to the pipe 40.

Since the pipe 40 has been reinforced with the tapes 10 and 18 and UV protective/abrasion resistant film 48, the pipe, tapes and film may not effectively bond with the inner surface of the coupler 30.

Figure 8:
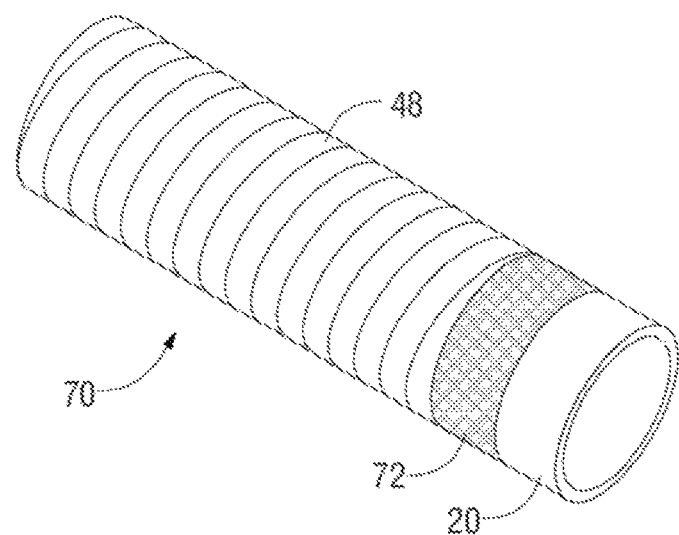
FIG. 8 is a perspective view of a thermoplastic pipe with an exposed area according to the present invention.

FIG. 8 shows a perspective view of the reinforced pipe 70 according to the present invention. An end of the reinforced pipe 70 includes an exposed area 20 where the fiber tapes 10, 18 (not shown) and the UV protective/abrasion resistant film 48 have been removed. The exposed area 20 is the original thin walled HDPE pipe. In one embodiment, the exposed area is about 4⅞ inches in length. Removal of the tapes 10, 18 and the film 48 in the exposed area 20 can be done in many ways. In one embodiment, the tapes 10, 18 and the film 48 are scraped from the pipe 70 using a mechanical scrapper.

Figure 9:
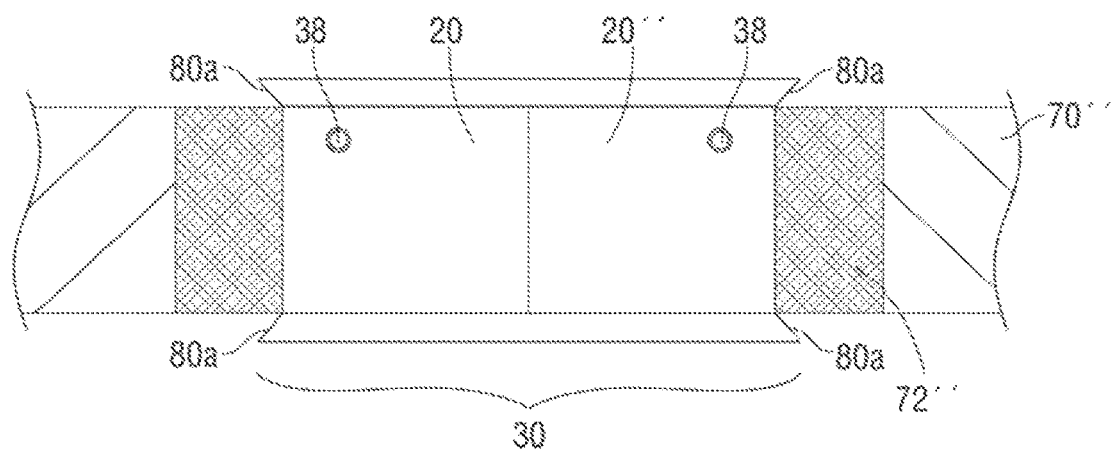
FIG. 9 is a side view of an electronic fusion coupler joining thermoplastic pipes according to the present invention.

FIG. 9 shows a side view of two pipes joined by a coupler according to the present invention. The pipes 70 and 70" are inserted into the coupler 30. Electrical ports 38 allow heating wires (not shown) to be wound to the internal surface of the coupler 30. The exposed areas 20 and 20" of the outer surfaces of pipes 70 and 70", respectively, are in contact with the heating surface of the coupler 30. As an electrical current is apply to the wires, the surfaces of pipes 70 and 70" are bonded with the internal surfaces of the coupler 30 effectively joining the pipes 70 and 70" together for fluid transport. Since the pipes 70 and 70" include reinforced ends 72 and 72", in one embodiment, the ends of the coupler 30 include beveled ends 80a along the lip of the coupler to allow the reinforced ends 72 and 72" to fit snugly up against the coupler 30. In one embodiment, the angle for the bevels is approximately 22 degrees from the horizontal.

Other coupling means can be used with the pipes. In another embodiment, a re-usable two section EF coupler can be used to join the reinforced thermoplastic pipes. Thus, a thin wall thermoplastic pipe can be re-used without the need to cut the pipe from the couplers. The length of the pipes is not shortened thus allowing additional re-uses of the pipes.

The pipe 70 is reusable. Typically, the initial length of the pipe 70 is 30 feet in length. To reuse the pipe 70 and depending on the type of coupler, the pipe is cut from the coupler 30. Ends of the cut pipe are scraped of the tapes 10, 18 and 48 to once again create an exposed area for further coupling of the pipe 70 at another site. The scraping of the tapes from the pipe's 70 outer surface ends can be done in the field, thus allowing for quick turnaround and reuse. Transport costs are reduced in view of the overall light weight of the thin wall thermoplastic pipe and light weight tape and film. In one embodiment, the novel piping system has a weight density of less than 128 lbs./30 feet. Application of the novel system can include transport of water during fracturing operations, removal of waste water from oil and gas sites or temporary supply of water or removal of waste water during emergency situations.

For example, in one embodiment, the novel piping system can transport 150 bbls/minute with a 10.5" inner diameter (ID)/11" outer diameter thin walled HDPE pipe and 200 PSI with 1.5 SF. Furthermore, repair and reuse of the novel pipes are possible at a lower cost than traditional piping systems. The novel system can be used above ground and without traditional support blocks or other support platforms in a piggy back configuration. The clearing of an area for the laying of the novel piping system may not be needed. The flexible piping system can be used in forests or other high density areas with obstacles. Since the pipes are made of HDPE materials, threat of thief is reduced (in comparison with metal pipes).

Figure 10:
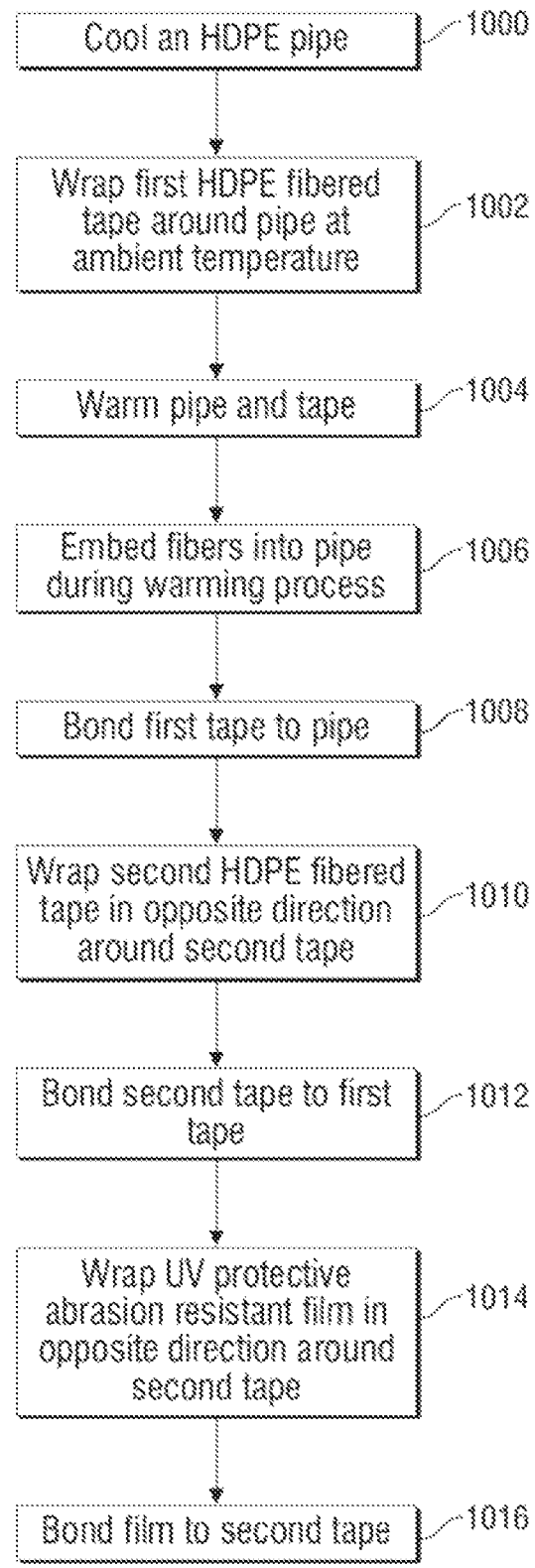
FIG. 10 is a flow chart of the method of manufacturing a reinforced thermoplastic pipe according to the present invention.

FIG. 10 is a flow chart identifying the steps of an exemplary method of manufacturing a reinforced thermoplastic pipe according to the present invention. At step 1000, an HDPE pipe is cooled. In one embodiment the temperature of the outer surface of overall pipe is around 40 degrees F. At step 1002, at ambient temperature, a HDPE continuous and taut fiber tape is wrapped around the outer surface of the cooled pipe. At step 1004, the tape and pipe are warmed to a surface temperature of 375 to 450 degrees F. At step 1006, as the tape and pipe are warmed, the fibers in the tape are embedded into the pipe due to thermal expansion of the pipe and the taut characteristic of the wrapped fibers. At step 1008, as the tape and pipe cool, a homogenous bond occurs. At step 1010, a second HDPE continuous and taut fiber tape is wrapped around the first tape in an opposite direction. At step 1012, heat is applied to the second tape and when cooled, the second tape homogenously bonds to the first tape. In one embodiment the surface of the second tape is heated to around 375 to 450 degrees F. At step 1014, a UV protective/abrasion resistant film is wrapped around the second tape in an opposition direction from the second tape. At step 1016, the film is heated and when cooled the film bonds to the second tape.

The foregoing disclosure and description of the invention are illustrative and explanatory thereof, and various changes in the details of the illustrated apparatus and system, and the construction and the method of operation may be made without departing from the spirit of the invention.

What is claimed is:

1. A method for manufacturing a reinforced pipe system for transporting a fluid, comprising:

contracting a high density polyethylene pipe by cooling the pipe below ambient temperature;

wrapping a fiber tape on a surface of the pipe while the pipe is contracted, said tape having continuous taut fibers;

securing ends of the fiber tape to the ends of the pipe using a first heat source;

warming the tape and pipe using a second heat source;

embedding the taut fibers into the pipe as the pipe is warmed; and bonding the tape to the pipe as the tape and pipe reach a thermal equilibrium and the pipe expands.

2. The method of claim 1, wherein the pipe has a thickness of less than 0.25 inches.

3. The method of claim 2 wherein the fiber tape includes continuous uni-directional fiberglass fibers.

4. The method of claim 1 wherein the fiber tape is a polyethylene tape.

5. The method of claim 1 where the first heat source is an iron.

6. The method of claim 4 further comprising the step of wrapping a second fiber tape over a surface of the first fiber tape.

7. The method of claim 6 where in the first fiber tape and second fiber tape are comprised of polyethylene material.

8. The method of claim 6 further comprising the step of wrapping a film over the surface of the second fiber tape.

9. The method of claim 8 wherein the film is a UV protective film.

10. The method of claim 8 wherein the film is an abrasion resistant film.

\* \* \* \* \*